Patented Apr. 27, 1937

2,078,440

UNITED STATES PATENT OFFICE 2,078,440

SALTS OF 5-PYRAZOLONE-4-AMINO-METHYL-SULPHONIC ACIDS

Max Bockmühl and Leonhard Stein, Frankfort-on-the-Main, Germany, assignors to Winthrop Chemical Company, Inc., New York, N. Y., a corporation of New York No Drawing. Application February 28, 1935, Serial No. 8,780. In Germany March 3, 1934

6 Claims. (Cl. 260—26)

The present invention relates to salts of 5-pyrazolone-4-amino-methyl-sulphonic acids.

We have found that salts of 5-pyrazolone-4-amino-methyl-sulphonic acids with organic bases containing at least one cyclic nitrogen atom have valuable therapeutic properties. These salts may be obtained by causing omega-methysulphonic acids of the pyrazoloneamines to react with the nuclear nitrogen bases. The aminomethysulphonic acids of the pyrazolone series may be obtained in a solid form from the corresponding amine, formaldehyde and sulphurous acid or by acidifying the salts of the corresponding aminomethanesulphonic acids, the operation being conducted in the presence of organic solvents with complete or partial exclusion of water. As methanesulphonic acids of the pyrazoloneamines there may be used those having the amino group in 4-position. As organic solvents there may, for instance, be used lower alcohols and ketones, such as methyl alcohol, ethyl alcohol, propyl alcohol, isopropyl alcohol, acetone, methylethyl ketone, furthermore acetic ester and benzene. If the aminomethylsulphonic acid is easily soluble in the organic solvent used for the preparation, a second organic solvent such as ether or the like may be used at any stage of the process.

The process may, for instance, be carried out by dissolving the amine in question in alcohol, introducing the molecular proportion of sulphurous acid and then adding the molecular proportion of formaldehyde. After addition of a few crystals the new acids then crystallize in most cases. If not, the precipitation may be induced by the addition of ether or another solvent. For the execution of the process it is immaterial in which sequence the different reactants are added. It is, therefore, possible to cause the aminesulphites first prepared to react with the formaldehyde or to cause the amines to react simultaneously with the formaldehyde and sulphurous acid. The Schiff's bases or the methylene-bis compounds of the amines which may be produced from the amines by reaction with the formaldehyde may be transformed with sulphurous acid into the corresponding methylsulphonic acids; in the latter case a further molecular proportion of formaldehyde is added in order to completely transform the amine into the methylsulphonic acid. With a like success it is also possible to start from the known alkali metal salts of the aminomethylsulphonic acids of pyrazolone-amines, made from the corresponding amines with the aid of formaldehyde and alkalibisulphite (cf. German Patent Specification 421,505) and to acidify the said alkali metal salts under the above stated conditions. When causing pyrazoloneamines to react with formaldehyde and sulphurous acid it is advantageous to work with solvents miscible with water. When causing methanesulphonic acid salts to react with acids it is also possible to work in the presence of a solvent which is not miscible with water.

It is important for the process of preparing aminomethylsulphonic acids of the pyrazolone series that no substantial amount of water be present. When causing pyrazolone amines to react with formaldehyde and sulphurous acid the presence of water cannot be entirely avoided, since the formaldehyde must be added in the form of an aqueous solution. The amount of water in the total volume of the reaction mixture should, however, not exceed 5 per cent. When causing the salts of methane-sulphonic acids to react with mineral acids, it is possible to work in the complete absence of water.

It may be advantageous to carry out the reaction between the omega-methylsulphonic acid of the pyrazoloneamines and the nuclear nitrogen bases cautiously, while cooling. It is immaterial whether one starts from the methylsulphonic acids themselves or whether they are used in statu nascendi. The process may, for instance, also be carried out by transforming the pyrazoloneamines into their sulphites and adding formaldehyde with addition of the bases to be used in each particular case, or by causing the methylenebis-compounds of the pyrazoloneamines to react with the bases and sulphurous acid, if desired, with addition of further amounts of formaldehyde.

As pyrazolone-sulphonic acids there may be used those of the formula:

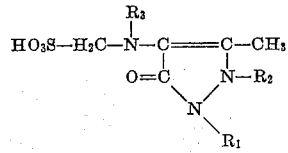

wherein $R_1$ stands for a monocyclic aromatic or a monocyclic six-membered hydroaromatic radical, $R_2$ for methyl or a monocyclic six-membered hydroaromatic radical and $R_3$ for lower alkyl or a monocyclic six-membered hydroaromatic radical, for instance 1-phenyl-2,3-dimethyl-4-methylamino-5-pyrazolone-4-methane-sulphonic acid;

1-para-methyl-phenyl-2,3-dimethyl-4-methylamino-5-pyrazolone-4-methane-sulphonic acid;

1-cyclohexyl-2,3-dimethyl-4- methylamino - 5 - pyrazolone-4-methane-sulphonic acid;

1 - para-methyl-cyclohexyl - 2,3 - dimethyl - 4 - methylamino-5-pyrazolone-4-methane-sulphonic acid;

1,2-dicyclohexyl-3-methyl-4 - methylamino - 5 - pyrazolone-4-methane-sulphonic acid;

1-phenyl-2,3-dimethyl-4- cyclohexylamino - 5 - pyrazolone-4-methane-sulphonic acid;

1-phenyl - 2,3 - dimethyl-4-para-methylcyclohexylamino-5-pyrazolone -4-methane - sulphonic acid;

1-phenyl-2,3-dimethyl-4-ethylamino- 5 -pyrazolone-4-methane-sulphonic acid;

As organic bases containing cyclic nitrogen there may be used:

The bases of the alkaloid series, such as quinine, cinchonine, morphine, codeine, cocaine, atropine, strychnine, nicotine, furthermore bases of the acridine series, such as 3,6-diamino-10-methyl-acridinium-hydroxide; 2-ethoxy-6,9-diamino-10-methylacridinium-hydroxide of the formula:

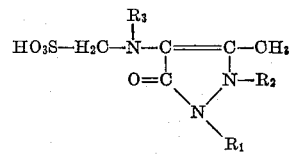

2,7-dimethyl-3,6-diamino-10-methyl-acridinium-hydroxide; 3,6-dimethoxy-10-methyl-acridinium-hydroxide.

The compounds are valuable medicaments which, as regards their efficacy, are superior to the various parent materials. They may, if desired, be mixed with other remedies or adjuvants and are intended to be applied in therapy.

The following examples serve to illustrate the invention, but they are not intended to limit it thereto:

(1) 378 grams of quinine base are dissolved in 4 liters of alcohol and mixed, while heating, with 330 grams of 1-phenyl-2.3-dimethyl-4-methylamino-5-pyrazolone-4-methane-sulphonic acid. On cooling, the 1-phenyl-2,3-dimethyl-4-methylamino-5-pyrazolone - 4 - methane-sulphonate of quinine crystallizes from the clear liquid. The yield is almost quantitative. The product has the melting point of 163° C. to 165° C.

(2) 189 grams of quinine base are suspended in 1200 cc. of water and gradually mixed at a temperature of about 60° C. with 165 grams of 1 - phenyl-2,3-dimethyl-4-methylamino-5-pyrazolone-4-methane-sulphonic acid. On cooling, the quinine salt described in Example 1 crystallizes in an almost quantitative yield.

(3) 0.38 gram of anhydrous morphine base are suspended in a small quantity of water and dissolved by addition of 0.415 gram of 1-phenyl-2,3-dimethyl-4-methylamino-5-pyrazolone -4- methane-sulphonic acid. The 1-phenyl-2,3-dimethyl-4-methylamino-5-pyrazolone-4-methane-sulphonate of morphine thus formed is mixed with 500 grams of sodium 1-phenyl-2,3-dimethyl-4-methylamino-5-pyrazolone-4-methane-sulphonate and the whole is made up with water to 1000 cc. When dissolution is complete the liquid is filled into ampoules.

(4) 7.4 grams of quinine base and 6.6 grams of 1 - cyclohexyl-2,3-dimethyl-4-methylamino-5-pyrazolone-4-methanesulphonic acid (prepared according to our co-pending application above referred to) are dissolved in 40 cc. of acetone and the solution is mixed with ether until it begins to become turbid. On cooling, the quinine salt formed crystallizes; it is subsequently washed with ether. Melting point 151° C. to 153° C. The salt is soluble in water.

(5) 10 grams of quinine base and 10 grams of 1-phenyl - 2,3-dimethyl-4-cyclohexenylamino-5-pyrazolone-4-methane-sulphonic acid are dissolved in 10 cc. of alcohol and the solution is mixed hot with 200 cc. of acetone. The quinine salt of 1-phenyl-2,3-dimethyl-4-cyclohexenylamino-5-pyrazolone-4-methane - sulphonic acid which crystallizes on cooling has the melting point of 173° C. to 175° C.

(6) 50 grams of 3,6-diamino-10-methylacridinium-hydroxide and 62 grams of 1-phenyl-2,3-dimethyl-4-methylamino-5 - pyrazolone-4 - methane-sulphonic acid are covered with 250 cc. of alcohol. On gently heating dissolution occurs. On cooling and adding a few crystals the resultant salt of the 3,6-diamino-10-methyl-acridinium-hydroxide crystallizes in a good yield. Melting point 229° C. with decomposition.

(7) 217 grams of 1-phenyl-2,3-dimethyl-4-methylamino-5-pyrazolone, 85 grams of an aqueous solution of formaldehyde of 35 per cent strength and 370 grams of quinine base are dissolved in 3 liters of alcohol and 64 grams of sulphur dioxide are introduced into the liquid, while cooling. After a short time the 1-phenyl-2,3-dimethyl-4-methylamino-5-pyrazolone-4-methane-sulphonate of quinine crystallizes. The yield amounts to about 90 per cent. Melting point 163° C. to 165° C. The product is identical with the salt obtained according to Example 1.

We claim:

1. The salts of 5-pyrazolone-4-amino-methylsulphonic acids with organic bases containing at least one cyclic nitrogen atom, said salts showing valuable therapeutic properties.

2. The salts of organic bases containing at least one nitrogen atom with compounds of the following general formula:

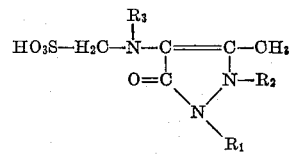

wherein R₁ stands for a member of the group consisting of monocyclic aromatic and mono-cyclic six-membered hydroaromatic radicals, R₂ for a member of the group consisting of methyl and monocyclic six-membered hydroaromatic radicals and R₃ for a member of the group consisting of lower alkyl radicals and mono-cyclic six-membered hydroaromatic radicals, said products showing valuable therapeutic properties.

3. The salts of bases of the alcaloid series with compounds of the following general formula:

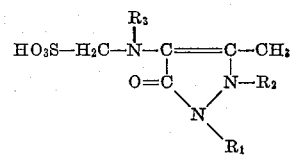

wherein R₁ stands for a member of the group consisting of monocyclic aromatic and monocyclic six-membered hydroaromatic radicals. R₂ for a member of the group consisting of methyl and mono-cyclic six-membered hydroaromatic radicals and R₃ for a member of the group consisting of lower alkyl radicals and mono-cyclic six-membered hydroaromatic radicals, said products showing valuable therapeutic properties.

4. The salt of quinine with 1-phenyl-2,3-dimethyl-4-methylamino-5-pyrazolone-4-methyl-sulphonic acid, said salt showing valuable therapeutic properties.

5. The salt of quinine with 1-cyclohexyl-2,3-dimethyl-4-methylamino-5-pyrazolone-4-methyl-sulphonic acid, said salt showing valuable therapeutic properties.

6. The salt of morphine with 1-phenyl-2,3-dimethyl-4-methylamino-5-pyrazolone-4-methyl-sulphonic acid, said salt showing valuable therapeutic properties.

MAX BOCKMÜHL.
LEONHARD STEIN.